United States Patent
Sun et al.

(10) Patent No.: US 10,328,747 B2
(45) Date of Patent: Jun. 25, 2019

(54) WHEEL FASTENING SYSTEM FOR DIRECTION-PRECISE MOBILE ROBOT WITH WHEELS

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Yu-Chun Sun, New Taipei (TW); Zhan-Sheng Lu, Shenzhen (CN); Ze-Min Wu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/863,841

(22) Filed: Jan. 5, 2018

(65) Prior Publication Data

US 2019/0160862 A1    May 30, 2019

(30) Foreign Application Priority Data

Nov. 24, 2017   (CN) .......................... 2017 1 1195505

(51) Int. Cl.
| | |
|---|---|
| *B60B 3/00* | (2006.01) |
| *B60B 3/16* | (2006.01) |
| *B25J 5/00* | (2006.01) |
| *B60B 3/14* | (2006.01) |
| *B60K 7/00* | (2006.01) |
| *B60B 35/18* | (2006.01) |

(52) U.S. Cl.
CPC .................. *B60B 3/16* (2013.01); *B25J 5/007* (2013.01); *B60B 3/145* (2013.01); *B60B 35/18* (2013.01); *B60K 7/0007* (2013.01)

(58) Field of Classification Search
CPC .. B60B 3/16; B60B 9/26; B60B 3/145; B60K 7/0007
See application file for complete search history.

(56) References Cited

U.S. PATENT DOCUMENTS

| | | | | |
|---|---|---|---|---|
| 8,774,966 | B2 * | 7/2014 | Ziegler | ...................... A47L 5/14 700/245 |
| 9,096,281 | B1 * | 8/2015 | Li | ........................... B62D 55/02 |
| 2012/0200149 | A1 * | 8/2012 | Rudakevych | ............. B60B 9/26 305/109 |
| 2012/0265343 | A1 * | 10/2012 | Gilbert, Jr. | .............. A47L 11/34 700/259 |
| 2013/0340529 | A1 * | 12/2013 | Lama | ................... G01N 29/225 73/584 |

(Continued)

*Primary Examiner* — Hau V Phan
(74) *Attorney, Agent, or Firm* — ScienBiziP, P.C.

(57) ABSTRACT

A wheel fastening system for a wheeled mobile robot includes a chassis, a motor, a wheel, a thrust bearing, a stud, and a screw. The chassis has a base and a cover. The cover covers the base. The motor is disposed in the chassis. The motor has a shaft. The wheel has a hub by which the wheel is centered on the shaft of the motor. The thrust bearing is an interference fit between the wheel and the chassis and provides axial support for the wheel. The stud passes through the hub of the wheel to couple to the shaft of the motor. The screw is coupled to the stud, and is clamped between the base and the cover of the chassis. The stud and the screw prevent the wheel from radially shifting relative to the shaft of the motor.

17 Claims, 4 Drawing Sheets

(56) References Cited

U.S. PATENT DOCUMENTS

| | | | |
|---|---|---|---|
| 2015/0107037 A1* | 4/2015 | Gilbert, Jr. | A47L 9/0477 |
| | | | 15/98 |
| 2015/0269963 A1* | 9/2015 | Erpelding | G11B 15/67 |
| | | | 242/332.4 |
| 2017/0036349 A1* | 2/2017 | Dubrovsky | G05D 1/0259 |
| 2018/0022197 A1* | 1/2018 | Bewley | B60K 7/0007 |
| | | | 180/21 |

* cited by examiner

WHEEL FASTENING SYSTEM FOR DIRECTION-PRECISE MOBILE ROBOT WITH WHEELS

CROSS REFERENCE TO RELATED APPLICATION

This application claims priority to Chinese Patent Application No. 201711195505.8, filed on Nov. 24, 2017, the disclosure of which is incorporated herein by reference in its entirety.

FIELD

The present disclosure relates generally to mobile robot controls, and more particularly to a wheel fastening system for a wheeled mobile robot.

BACKGROUND

Mobile robots are classified as wheeled, legged, or tracked. The wheeled mobile robots are driven by wheels to achieve movement thereof. However, during movement of the wheeled mobile robot, the wheel may fail to remain coaxial with the shaft of the motor such that the direction of movement is not precise. Thus, the work productivity is low and damage can happen.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
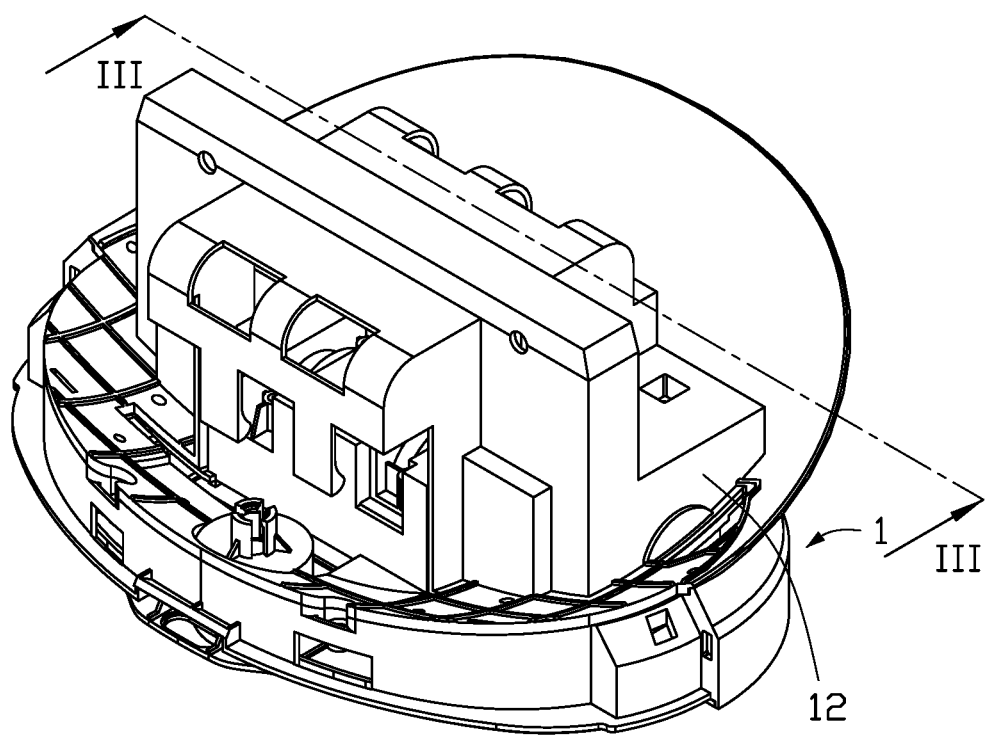
FIG. 1 is a top perspective view of a wheel fastening system for a wheeled mobile robot.
Figure 1:
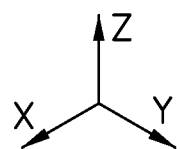

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

Figure 2:
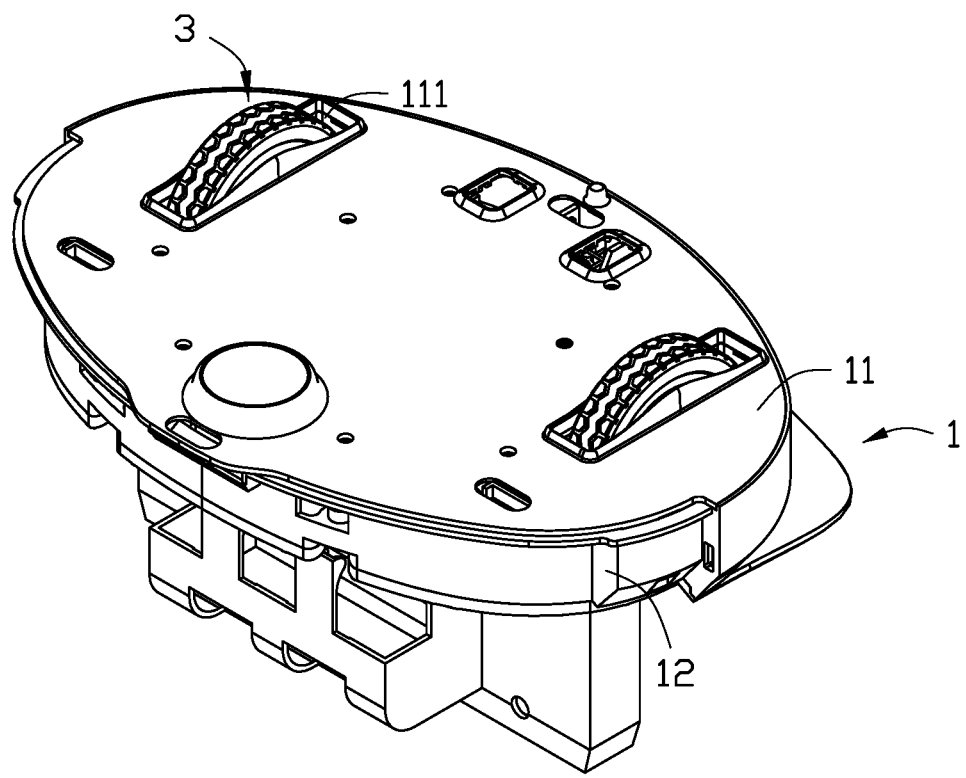
FIG. 2 is a bottom perspective view of the wheel fastening system of FIG. 1.
Figure 3:
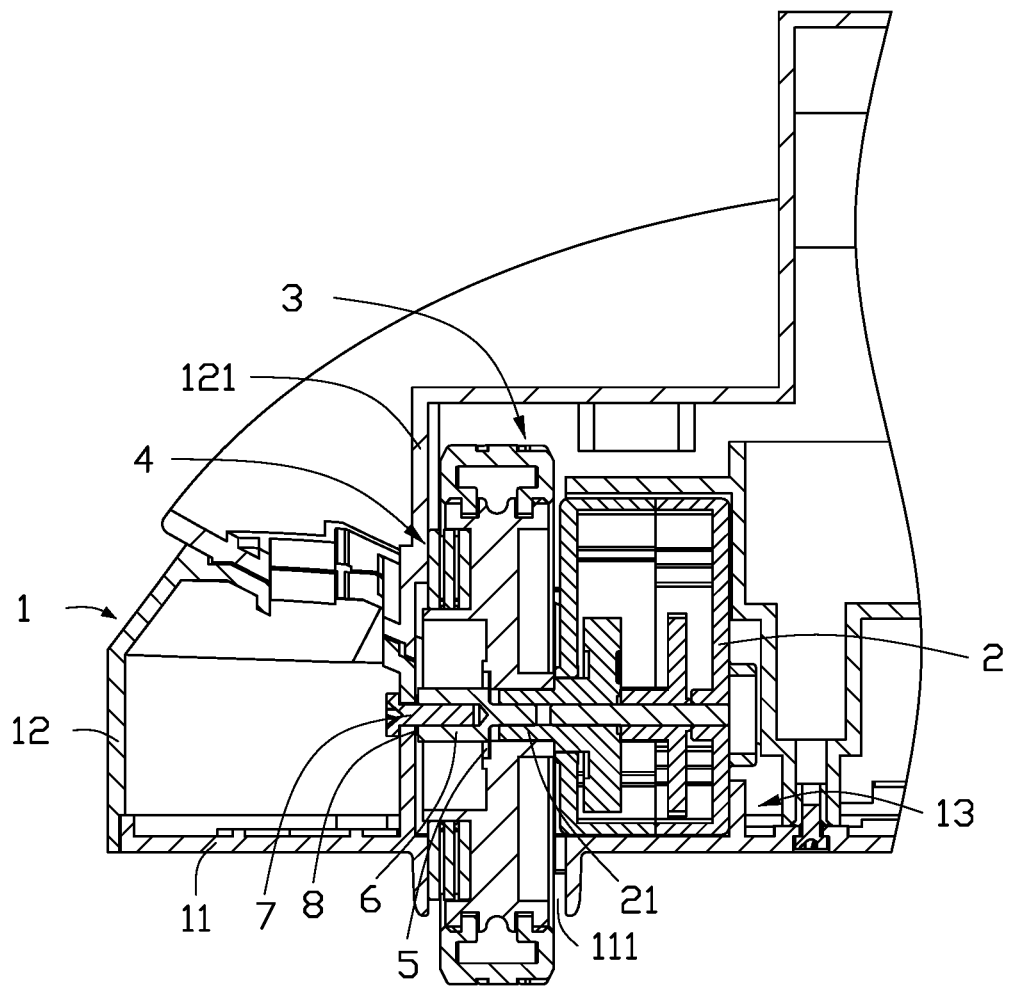
FIG. 3 is an enlarged partial cross-sectional view taken along line in FIG. 1.

With reference to FIGS. 1-3, an exemplary embodiment of a wheel fastening system for a wheeled mobile robot includes a chassis 1, a motor 2, a wheel 3, a thrust bearing 4, a washer 5, a stud 6, a screw 7, and a sealant 8.

The chassis 1 includes a base 11, a cover 12, and a chamber 13. The base 11 is oval shaped. The base 11 has a slot 111. The cover 12 covers the base 11. The cover 12 has a side wall 121. The chamber 13 is defined between the base 11 and the cover 12.

The motor 2 is securely disposed within the chamber 13 of the chassis 1, and is clamped between the base 11 and the cover 12 of the chassis 1. The motor 2 has a shaft 21 to output torque.

Figure 4:
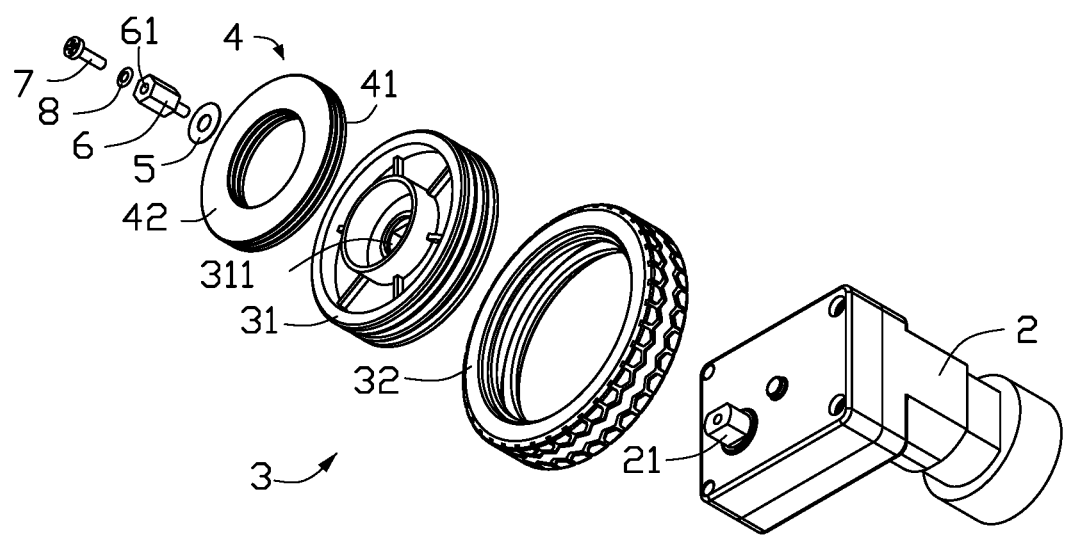
FIG. 4 is a partially exploded perspective view of the wheel fastening system of FIG. 1.

With further reference to FIG. 4, the wheel 3 has a rim 31 and a tire 32 mounted on the rim 31. The rim 31 has a hub 311 by which the wheel 3 is centered on the shaft 21 of the motor 2. The motor 2 drives the wheel 3. The wheel 3 is partially disposed in the chamber 13 of the chassis 1 and partially protrudes out of the slot 111 of the base 11 of the chassis 1.

The thrust bearing 4 is an interference fit between the wheel 3 and the side wall 121 of the cover 12 of the chassis 1. The thrust bearing 4 withstands axial loads applied to the wheel 3. The thrust bearing 4 has a shaft washer 41 and a housing washer 42. The shaft washer 41 abuts the wheel 3 to rotate with the wheel 3. The housing washer 42 abuts the side wall 121 of the cover 12 of the chassis 1 and does not rotate.

The washer 5 is mounted on the hub 311 of the rim 31 of the wheel 3. The stud 6 passes through the hub 311 of the rim 31 of the wheel 3 to couple to the shaft 21 of the motor 2 and to abut the washer 5, so as to secure the wheel 3 to the shaft 21 of the motor 2. The screw 7 is coupled to the stud 6 and is clamped between the base 11 and the cover 12 of the chassis 1. The sealant 8 is injected between the stud 6 and the screw 7, so as to strengthen the connection between the wheel 3 and the shaft 21 of the motor 2. Preferably, the stud 6 is a copper stud having a threaded hole 61. The screw 7 is a machine screw, that is, a machine screw with for example a diameter of 2 mm and a length of 7 mm. The screw 7 is screwed in the threaded hole 61 of the stud 6.

The thrust bearing 4 provides axial support for the wheel 3 in the Y-axis direction, and the washer 5, the stud 6, the screw 7, and the sealant 8 prevent the wheel 3 from radially shifting in the X-axis and Z-axis directions relative to the shaft 21 of the motor 2. The wheel 3 is constrained to remain coaxial with the shaft 21 of the motor 2. Thus, the wheeled mobile robot does not deviate from a chosen direction during movement, to ensure a stable working productivity and prevent damage.

The exemplary embodiments shown and described above are only examples. Many details are often found in the art such as the other features of a wheeled mobile robot. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A wheel fastening system for a wheeled mobile robot, comprising:
   a chassis, the chassis comprising:

a base;

a cover covering the base, and the cover comprising a side wall; and a chamber defined between the base and the cover;

a motor disposed within the chamber of the chassis, and the motor comprising a shaft;

a wheel comprising a hub by which the wheel is installed on the shaft of the motor;

a thrust bearing interference fitted between the wheel and the side wall of the cover of the chassis, and the thrust bearing comprising:

a shaft washer abutting the wheel to rotate with the wheel; and a housing washer abutting the side wall of the cover and not rotating;

a stud passing through the hub of the wheel to couple the wheel to the shaft of the motor; and a screw coupled to the stud and clamped between the base and the cover of the chassis.

2. The wheel fastening system of claim 1, further comprising a washer mounted on the hub of the wheel;

wherein the stud abuts the washer.

3. The wheel fastening system of claim 2, further comprising a sealant injected between the stud and the screw.

4. The wheel fastening system of claim 3, wherein the motor is clamped between the base and the cover of the chassis.

5. The wheel fastening system of claim 2, wherein the motor is clamped between the base and the cover of the chassis.

6. The wheel fastening system of claim 2, wherein the wheel has:

a rim having the hub; and a tire mounted on the rim.

7. The wheel fastening system of claim 2, wherein the stud is a copper stud having a threaded hole, and the screw is a machine screw screwed in the threaded hole of the stud.

8. The wheel fastening system of claim 2, wherein the base has a slot; and wherein the wheel is partially disposed in the chamber of the chassis and partially protrudes out of the slot of the base.

9. The wheel fastening system of claim 1, further comprising a sealant injected between the stud and the screw.

10. The wheel fastening system of claim 9, wherein the motor is clamped between the base and the cover of the chassis.

11. The wheel fastening system of claim 9, wherein the wheel has:

a rim having the hub; and a tire mounted on the rim.

12. The wheel fastening system of claim 9, wherein the stud is a copper stud having a threaded hole, and the screw is a machine screw screwed in the threaded hole of the stud.

13. The wheel fastening system of claim 9, wherein the base has a slot; and wherein the wheel is partially disposed in the chamber of the chassis and partially protrudes out of the slot of the base.

14. The wheel fastening system of claim 1, wherein the motor is clamped between the base and the cover of the chassis.

15. The wheel fastening system of claim 1, wherein the wheel has:

a rim having the hub; and a tire mounted on the rim.

16. The wheel fastening system of claim 1, wherein the stud is a copper stud having a threaded hole, and the screw is a machine screw screwed in the threaded hole of the stud.

17. The wheel fastening system of claim 1, wherein the base has a slot; and wherein the wheel is partially disposed in the chamber of the chassis and partially protrudes out of the slot of the base.

\* \* \* \* \*